United States Patent [19]

Johns

[11] 4,145,029

[45] Mar. 20, 1979

[54] CLEVIS AND MOUNTING ANCHOR FOR A PULLEY

[76] Inventor: Allen R. Johns, Harbert Rd. Rte. 1, Box 183, Sawyer, Mich. 49125

[21] Appl. No.: 852,516

[22] Filed: Nov. 17, 1977

[51] Int. Cl.² .......................... B66D 3/04; B66D 1/36; F16C 11/06

[52] U.S. Cl. ...................................... 254/188; 254/192; 403/157

[58] Field of Search ...................... 74/230.01; 254/188, 254/191, 192, 195; 403/302, 157

[56] References Cited

U.S. PATENT DOCUMENTS

| | | | |
|---|---|---|---|
| 719,124 | 1/1903 | Marshall | 254/195 |
| 1,491,751 | 4/1924 | McMillan | 254/188 |
| 2,343,086 | 2/1944 | Schultz | 254/188 X |

*Primary Examiner*—Leonard H. Gerin

*Attorney, Agent, or Firm*—Austin A. Webb

[57] ABSTRACT

A clevis having a pulley rotatably mounted between its outer ends has a bight or closed inner end of uniform thickness curved around a segment of a cylindrical surface with its axis parallel to the plane of rotation of the pulley, and spaced from the surface of the pulley. A retaining clamp bar has flat ends attachable to a mounting surface, and a center portion off-set upwardly from the plane of the ends by a distance no greater than the thickness of the bight of the clevis. The off-set center portion is curved transversely upwardly about a segment of a cylindrical surface substantially coincident with the axis of curvature of the bight of the clevis when the clamp bar is arranged through the clevis and secured at its ends to a supporting surface. The periphery of the pulley is concavely curved and spaced at its center from the bight of the clevis.

6 Claims, 3 Drawing Figures

CLEVIS AND MOUNTING ANCHOR FOR A PULLEY

OUTLINE OF INVENTION

Pulleys have been mounted or anchored in the past, either by rigidly connecting the bight of the clevis within which the pulley rotates to a fixed supporting surface, or by loosely hanging the bight of the clevis over an open hook or through a closed eye-bolt or staple-like hanger. In the former instance, the axis about which the pulley rotates is always disposed at a fixed angle relative to the supporting surface, although the axis of the pulley may rotate or orbit about a second axis of connection to the surface in some instances. When the clevis is hung on a hook or staple hanger, the pulley hangs below its supporting surface unless the pulling or tension force of the rope or cable engaged over the pulley moves the clevis until the tension force intersects with the anchor.

The purpose of the present invention is to provide a pulley mount in which the axis of rotation of the pulley may be adjusted through a wide angle relative to a supporting surface and which will retain the pulley in its adjusted position even when the line or cable rove through the pulley is loosened or slacked. To this end, the bight of the clevis which supports a pulley and the clamp which secures the clevis to a support are provided with mating semi-cylindrical surfaces which hold the bight of the clevis frictionally against a fixed surface when the clamp is tightened. In-so-far as is known this has never been done before. The pulley and its mount are particularly useful on small boats where anchor lines and sail shroud lines are desired to be arranged in a variety of fixed positions.

DESCRIPTION

A preferred embodiment of the pulley mount of the invention is disclosed in the accompanying drawings of which there is one sheet.

Figure 1:
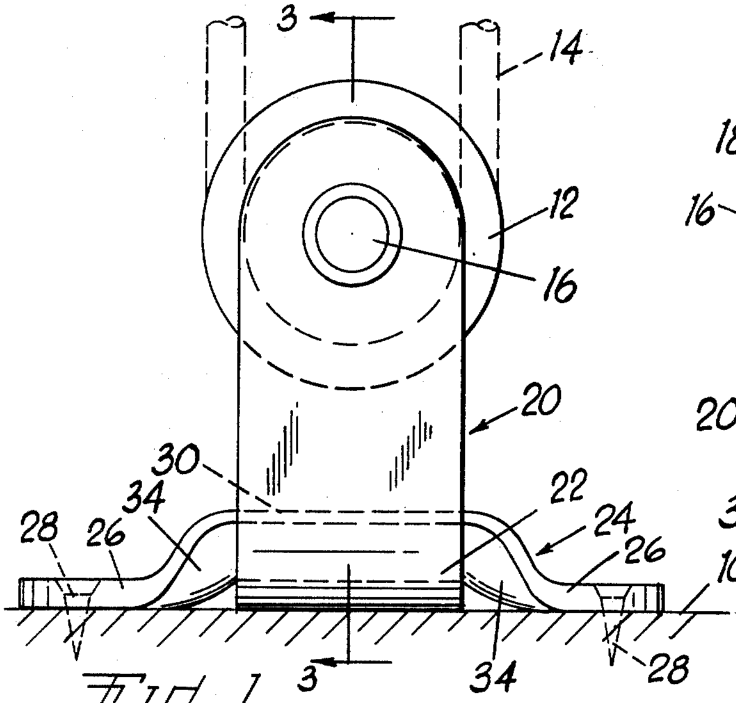
FIG. 1 is a side elevation of a pulley supported in one position by the mount of the invention.

For the purpose of description, a horizontal fixed surface is indicated at 10 with the pulley 12 supported above the surface and a line or cable 14 is rove around the pulley from above. It will be appreciated that the pulley could be mounted below or to one side of the supporting surface, and that terms relating parts of the pulley mount should be similarly variable.

The pulley 12 is rotatable about the axis of a shaft 16 and the ends of the shaft are supported by the opposite arms 18 of a clevis indicated generally by the numeral 20. Whether the pulley rotates on the shaft or the shaft rotates in the arms of the clevis is immaterial. The pulley is shown as having a concave periphery for centering cables, cords or lines 14 of circular cross-section, but this also is immaterial. The clevis 20 is made of flat bar stock and is bent in its center to form a U-shaped bight 22 of semi-cylindrical cross section.

Figure 2:
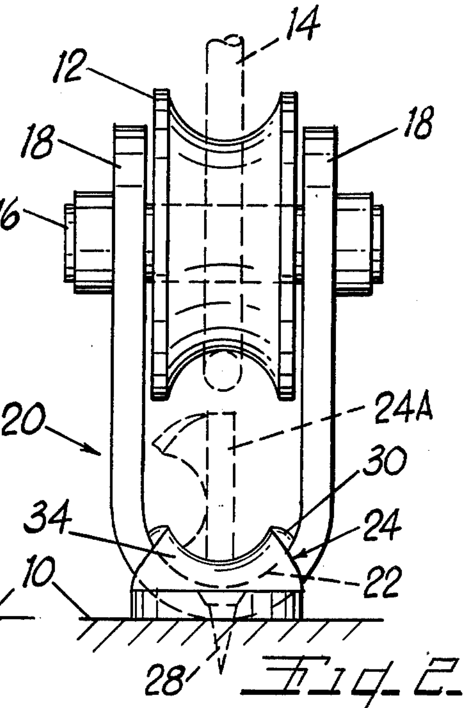
FIG. 2 is an end or edge elevational view of the pulley and mount shown in FIG. 1.
Figure 3:
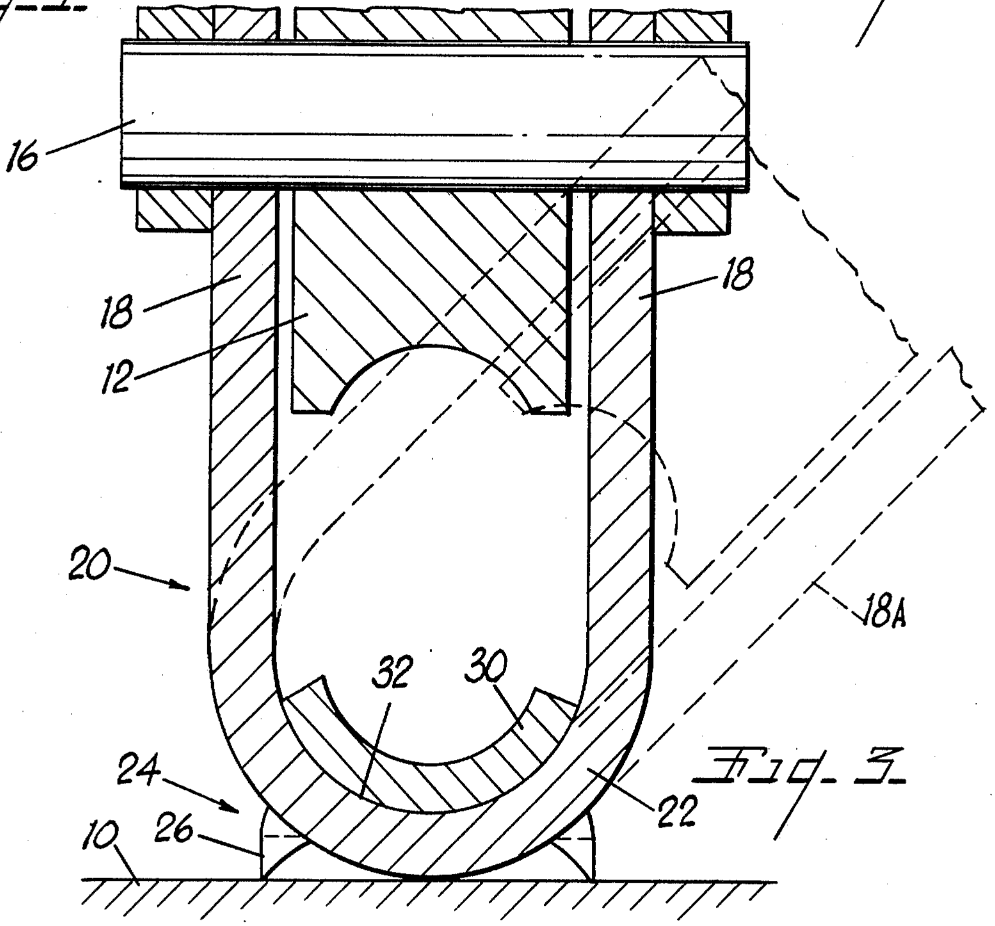
FIG. 3 is a fragmentary, enlarged, cross-sectional view taken along the plane of the line 3—3 in FIG. 1 and looking in the direction of the arrows.

The clevis 20 and particularly its semi-cylindrical bight 22 is held against the supporting surface 10 by a U-shaped clamp indicated generally by the numeral 24. Flat, coplanar ends 26 of the clamp are secured to the surface 10 as by screws 28. Between its ends the clamp or clamp bar is bent or off-set upwardly to provide a longitudinally straight center section 30 that extends through the curved bight 22. The center section is further curved transversely to provide a downwardly convex lower surface 32 which is curved along a segment of a cylindrical surface of the same radius as the inside of the bight of the clevis. The reversely angled portions 34 which connect the convex center 32 with flat ends 26 are dimensioned to locate the surface 32 above the support surface 10 by a distance which approximately equals, and is no greater than the thickness of the bight 22 of the clevis. It will be evident that when the screws 28 are drawn tight, the lower or exterior curve of the bight 22 will be held frictionally against the support surface 10, while the inner concave surface of the bight will be clamped against the convex underside 32 of the center part 30 of the clamp bar 24. By loosening one or both the screws 28, the arms 18 of the clevis may be adjusted to any angle relative to the surface 10, as is indicated by the dotted lines at 18A in FIG. 3. When the screws are tightened, the clevis and the pulley will maintain their adjusted position even though the cable or rope 14 is slackened or removed. By selecting the position of the clamp bar 24 rotatively on the surface 10, the pulley can be positioned to operate with lines or ropes directed to the pulley from any position above the support surface, without binding the pulley in the clevis. The reversely curved bends 34 in the clamp bar center the clevis longitudinally of the clamp bar. By proportioning the length of the arms 18 to the width of the clamp bar 24, the bar can be easily assembled through the clevis without removing the pulley as shown by the dotted position of the clamp bar at 24A in FIG. 2.

Desirably, the curved bight 22 of the clevis 20 and the off-set center section 30 of the clamp bar 24 are formed by stamping or pressing the parts in dies shaped to form the desired configurations and sizes. The only critical dimensions are the identity of the curvatures of the bottom or outside of the lower surface of the center 30 of the clamp and the inside surface of the bight 22 of the clevis; and the elevation of the center section 30 of the clamp above the flat ends 26. The latter must be no greater then the thickness of the bight 22 of the clevis. The elevation may be somewhat less than the thickness of the bight as small errors in this dimension can be overcome by drawing the flat ends 26 down with the screws. An error in raising the center section too high can be overcome by placing a shim below the bight 22 but this is not desirable and should be avoided.

What is believed to be new, and what is desired to be secured and protected by Letters Patent is defined in the following claims:

1. A pulley mount comprising a clevis having a pulley rotatably mounted between the outer ends of its arms, and a mounting clamp bar adapted to be extended through the bight of the clevis and attached at its ends to a mounting surface, said clevis and mounting clamp being characterized by concentric surfaces formed on the bight of said clevis and disposed about an axis parallel to the plane of rotation of said pulley, coplanar end portions on the ends of said clamp bar and having holes therein for receiving fasteners for forming the attachment of the bar to said mounting surface, and a center portion on said clamp bar off-set from said end portions, said center portion having a downwardly convex lower surface extending along a segment of a cylinder having a radius equal to the radius of the inner surface of the bight of said clevis, and spaced from the plane of the bottom of said end portions by a distance approximately equal to and no greater than the thickness of said bight between said concentric surfaces.

2. A pulley mount as defined in claim 1 in which the length of said convex surface on said clamp bar is approximately equal to and no less than the width of said concentric surfaces on the bight of said clevis.

3. A pulley mount as defined in claim 1 in which said convex surface on the center portion of said clamp bar is formed by bending said center portion to form concentric inner and outer surfaces thereon.

4. A pulley mount as defined in claim 3 in which the thickness of said clamp bar is approximately equal at its end portions and at its center portion.

5. A pulley mount as defined in claim 4 in which the length of said convex surface on said clamp bar is approximately equal to and no less than the width of said concentric surfaces on the bight of said clevis.

6. A pulley mount as defined in claim 4 in which the periphery of said pulley is concave, and in which the width of said clamp bar is less than the distance between the periphery of the pulley and the bight of the clevis.

* * * * *